United States Patent [19]

Parker

[11] Patent Number: 5,734,754
[45] Date of Patent: Mar. 31, 1998

[54] SYSTEM FOR MODEL-BASED COMPRESSION OF SPECKLE IMAGES

[75] Inventor: Kevin J. Parker, Rochester, N.Y.

[73] Assignee: University of Rochester, Rochester, N.Y.

[21] Appl. No.: 606,100

[22] Filed: Feb. 23, 1996

[51] Int. Cl.⁶ ..................................... G06K 9/00
[52] U.S. Cl. ............................. 382/243; 382/279
[58] Field of Search ...................... 382/232, 233, 382/235, 236, 239, 240, 241, 242, 243, 244, 248, 251, 279, 108, 109, 154, 181, 190, 201, 204, 205, 209, 217, 252, 253, 276, 280, 281, 282, 283, 284, 285, 293, 302, 307, 308, 312; 342/25, 26, 201, 189; 324/76.33, 76.36; 358/447, 464; 348/169; 364/516; 73/602, 607; 128/660.01; 359/9, 900

[56] References Cited

U.S. PATENT DOCUMENTS

| | | | |
|---|---|---|---|
| 4,101,891 | 7/1978 | Jain et al. | 343/17.2 PC |
| 4,322,974 | 4/1982 | Abele et al. | 73/602 |
| 4,701,006 | 10/1987 | Perlmutter | 350/3.66 |
| 5,107,837 | 4/1992 | Ophir et al. | 128/660.01 |
| 5,257,121 | 10/1993 | Steinberg | 358/447 |

OTHER PUBLICATIONS

"Segmentation of speckle images based on level-crossing statistics", by R.H. Sperry, et al., *J. Opt. Soc. Am. A.*, vol. 8, No. 3, pp. 490–498 (Mar. 1991).

"Deviations From Rayleigh Statistics in Ultrasonic Speckle", by T.A. Tuthill, et al., *Ultrasonic Imaging*, vol. 10, pp. 81–89 (1988).

"Radiologic Image Compression—A Review", by S. Wong, et al., *Proceedings of the IEEE*, vol. 83, No. 2, pp. 194–219 (Feb. 1995).

"Speckle noise in displays", by N. George, et al., *J. Opt. Soc. Am.*, vol. 66, No. 11, pp. 1282–1290 (Nov. 1976).

"Comparison of International Standards for Lossless Still Image Compression", by R.B. Arps, et al., *Proceedings of the IEEE*, vol. 82, No. 6, pp. 889–899 (Jun. 1994).

"Evaluating Quality of Compressed Medical Images: SNR, Subjective Rating, and Diagnostic Accuracy", by P.C. Cosman, et al., *Proceedings of the IEEE*, vol. 82, No. 6, pp. 919–932 (Jun. 1994).

*Primary Examiner*—Leo Boudreau
*Assistant Examiner*—Bijan Tadayon
*Attorney, Agent, or Firm*—Wigman, Cohen, Leitner & Myers, P.C.

[57] ABSTRACT

A system for the model-based compression of speckle images in which the pulse characteristics of the known coherent imaging system which generated the speckle image to be compressed are used together with a scatterer image model to modify that scatterer image to contain impulse information such that when the impulse information is convolved with the pulse, the speckle image is reproduced. The modified scatterer image is compressed and outputted together with the pulse characteristics so that the speckle image can be reproduced.

23 Claims, 4 Drawing Sheets

SYSTEM FOR MODEL-BASED COMPRESSION OF SPECKLE IMAGES

BACKGROUND OF THE INVENTION

The present invention is directed to the compression of images. More particularly, the present invention is directed to a system for the compression of speckle images which are particularly found in radar, laser and ultrasound images.

Images are typically compressed in the many instances where storage or transmission channel requirements dictate that the image information be represented in the most efficient manner possible. Most research in the area of image compression has been focused on the compression of photographic and television images. Those images typically have certain regions of slowly varying intensities such as the sky, or the forehead of the face under uniform illumination. In addition, certain types of medical images, such as computer-aided tomography, x-ray images and magnetic resonance images, frequently have sub-regions of relatively uniform or slowly varying image intensities. The use of most conventional compression techniques, such as JPEG, DPCM and sub-band encoding, are designed to take advantage of the redundancy of image intensity over those regions of an image. Also, when image sequences are transmitted, such as in video or teleconferencing broadcasts, the established compression techniques, such as MPEG and sub-band encoding, seek to exploit the redundancy in temporal as well as spatial information. For example, a slowly moving object can have a great redundancy from frame-to-frame. Such redundancy can be exploited for the purposes of compression. See, for example, S. Wong, et al., "*Radiologic Image Compression-A Review*," Proceedings of IEEE., Vol. 83(2) pp. 194–219 (1995).

As will be obvious to those of ordinary skill in the art, there is a need for an efficient system for the compression of speckle images, including radar, laser and medical ultrasound images that exhibit speckle. The mathematics and physics of speckle have been studied extensively. See, for example, N. George, et al. "*Speckle Noise and Displays*," J.O.S.A., Vol. 66(11), pp. 1282–1289 (1976); K. Parker, et al., "*Deviations from Rayleigh Statistics in Ultrasonic Speckle*," Vol. 10, pp. 81–89 (1988); R. Sperry and K. Parker, "*Segmentation of Speckle Images based on Level-Crossing Statistics*," J.O.S.A., Vol. 8(3) pp. 490–498 (1991). However, the problem of compression of speckle images has remained largely unsolved.

Speckle images are characterized by strong fluctuations in intensity, even when the illumination intensity and scatterer characteristics are relatively uniform over a given region. Such strong fluctuations in intensity are caused by the constructive/destructive interference of a coherent laser, radio frequency or ultrasound source with many unresolvable scatters or reflectors. As a consequence, a speckle image, for example, a 3.5 MHz ultrasound scan of a liver or kidney is very difficult to compress using standard JPEG, DPCM or sub-band encoding techniques. Such conventional techniques need to exploit redundancy in the images, however, since the speckle image is characterized by high spatial frequencies, or major fluctuations in image intensities across small regions, such conventional techniques do not work adequately to compress speckle images.

Speckle images are dramatically different from "normal" photographic images. The physics and mathematics of speckle formation in ultrasound are well understood, but the compression of those complex images has not been solved. The present invention describes a new class of compression techniques, based on models of speckle formation, that yield compression ratios far beyond those achievable by JPEG, DPCM or other techniques that were perfected for "photographic" images. The present invention can achieve compression ratios of 100–300 while maintaining the functional and diagnostic image information.

Such powerful compression ratios are useful, for example, for portable scanners operating near conflict zones. For example, a single frame full color Doppler ultrasound image can require approximately 5.75 Mbits of memory in a video-capture board. Transmission of a 16 kbps RF channel would require six minutes, assuming that no errors in transmission occur. Using the present invention, a color Doppler image can be transmitted in three seconds or less.

Because there is an incompatibility between speckle images and conventional compression techniques, there is a need in the art for new compression techniques that are well-suited for application to speckle image characteristics. Furthermore, where image sequences are available, such as the 3.5 MHz ultrasound real-time scan of a beating heart, or a 7 MHz ultrasound scan of blood flow in the carotid artery, or including slow movement of the transducer as different image planes are systematically searched, there can be a rapid decorrelation of speckle from frame-to-frame as scatterers translate and rotate with respect to the imaging transducer. Such speckle decorrelation is responsible for very poor frame-to-frame redundancy in many speckle image sequences. That precludes the use of conventional sequence compression techniques for speckle images, since such conventional image sequence compression techniques rely on frame-to-frame redundancy in order to accomplish successful compression. Thus, there exists a great need in the art for novel techniques for compression of speckle image sequences.

The novel compression techniques discussed herein are based on a philosophy of image compression known as "model-based compression." That approach seeks to accomplish more than simply utilize redundancy of image pixel values for compression. Rather, model-based compression is designed to utilize an accurate model of image formation. If an image can be accurately represented by a model of image formation, then, in a remote imaging situation, only relatively few bits of information concerning parameters of the image formation model need to be sent from a transmitter to a receiver, so long as both the transmitter and receiver utilized the same image formation model.

This new model-based compression technique is applied to speckle image compression. For example, in the case of medical ultrasound, a speckle image can modeled as a convolution of a propagating pulse with quasi-random scatterers located in tissue. The constructive and destructive interference of the coherent pulse with sub-resolvable scatterers gives rise to speckle patterns. Radiologists, sonographers, and clinicians trained in reading ultrasound images expect to see speckle images from ultrasound scanners. Trained clinicians examine images for subtle shifts in speckle texture. Therefore, speckle images are accepted in diagnostic uses of ultrasound and past commercial attempts to provide "de-speckled" images have not been positively received by the medical community. Because of that fact, the present invention reproduces the traditional speckle images while at the same time providing large compression ratios. Even with modest compression ratios of between 40 and 20, the quality and accuracy of the transmitted images using the present invention is well beyond that of the JPEG compression.

SUMMARY AND OBJECT OF THE INVENTION

In view of the foregoing, it should be apparent that there is still an exists a need in the art for a system for accurately and efficiently compressing speckle images in a simple and precise manner. It is, therefore, a primary object of this invention to provide a system for speckle image compression which employs an accurate model of speckle formation and a-priori knowledge about the imaging system's frequency and beamwidth characteristics in order to accurately compress the speckle image.

More particularly, it is an object of this invention to provide a system for employing an accurate model of speckle formation together with a-priori knowledge concerning the image system's beamwidth characteristics such that a speckle image can be decomposed into a much simpler representation of a pulse convolving with a set of scatterers and so that the compressed information can be rapidly decoded by a receiver and reconstructed into the desired original speckle image.

Still more particularly, it is an object of the present invention to provide a reliable and accurate system for speckle image compression in which a given speckle image is fitted to the image formation model in an accurate manner in order to derive model scatterer information.

Another object of the present invention is to provide a system for speckle image compression in which the image formation model pulse is encoded together with the derived scatterer information.

Still another object of the present invention is to provide a system for the compression of speckle images in which the compressed speckle images are reconstructed from the pulse and scatterer information provided to a receiver together with the model of the image formation.

Briefly described, these and other objects of the invention are accomplished by performing a series of steps after selecting the speckle image to be compressed. Obviously, selecting a speckle image that has been compressed using a known coherent imaging system also provides the pulse characteristics of that known coherent imaging system.

After the image to be encoded or compressed is selected and the pulse characteristics of the coherent imaging system which produced that speckle image are obtained, a scatterer image representing a hypothetical and simple set of reflections that could interact with the imaging pulse, is set to zero. Then, the location of a first speckle local maxima in the selected image is determined. Next, the appropriate impulse strength which, when convolved with at least one of the pulse characteristics, accurately reproduces the speckle maxima, is determined. The thus determined appropriate impulse strength is located in the scatterer image in a location corresponding to the location of the first speckle local maxima.

Then, a determination is made of whether all of the local speckle maxima have been analyzed. If any other local speckle maxima are found, then they are analyzed in the same manner as just described in connection with the first speckle local maxima.

Once all of the local speckle maxima have been analyzed, then the modified scatterer image or impulse image is then compressed or encoded using one of several known compression or encoding methods. The encoded or compressed files and the pulse parameters are then outputted.

If the selected speckle image is to be reproduced at a remote location, the encoded or compressed files and pulse parameters or characteristics are received at a remote location. The scatterer image information is decompressed and then the pulse is convolved with the scatterer image in order to reconstruct the speckle image. The thus reconstructed speckle image may be outputted for display or storage.

As will also be described herein, residual errors which occur during the process of encoding or compressing the modified scatterer image or pulse image may also be encoded or compressed using one of several known encoding methods and output as part of the encoded files and pulse parameters. In that case, the reconstruction of the speckle image is enhanced by the steps of decompressing the residual errors thus transmitted as part of the encoded files. Those residual errors are then added to the reconstructed speckle image prior to its output for storage or display purposes.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
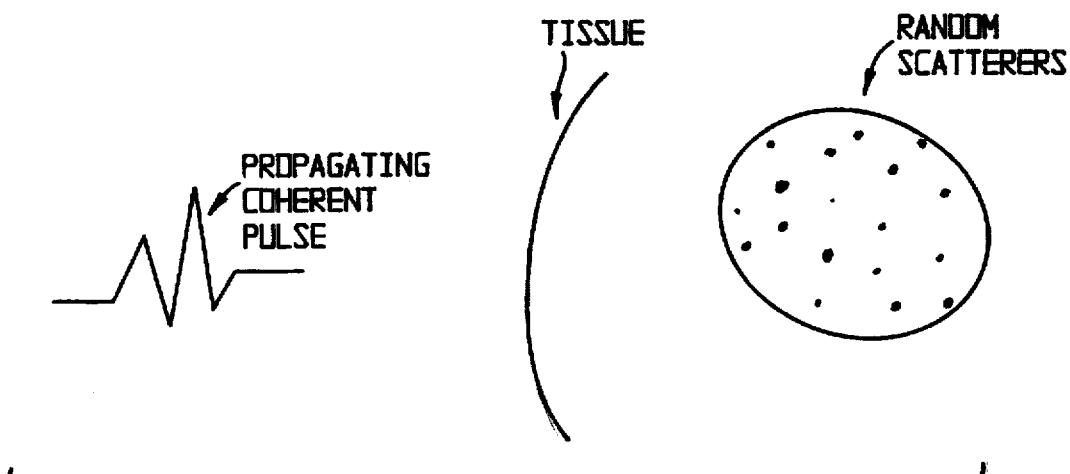
FIG. 1 is a drawing showing the theoretical equivalence of an ultrasound speckle image as the convolution of a pulse with scatterers.

Referring now to the drawings wherein the like parts are designated by like reference numerals throughout, there is illustrated in FIG. 1 a drawing showing that, in the case of medical ultrasound situations, a coherent acoustic pulse propagates through space and interacts with scatterers (or reflectors) in tissues. The scattered or reflected energy is received by an imaging transducer (not shown). In a similar manner, radar images are produced with RF pulses and optical speckle images with coherent light. Those interactions can be modeled as the 2-dimensional convolution of a pulse with an ensemble of scatterers. The 2-D pulse and scatterer models necessarily incorporate, by projection, the third dimension. That third dimension, in ultrasound imaging, is the imaging slice thickness dimension.

In such circumstances, the approximate details of the 2-dimensional pulse are usually known. For example, an ultrasound transducer is always selected by its center frequency and the bandwidth and beamwidth characteristics are usually calibrated. Thus, the details of the pulse to be used by the instant invention in its model image formation are a-priori information. Thus, it is necessary to determine the minimal set of scatterers which, when convolved with that pulse, will accurately reproduce the original speckle image.

Figure 2:
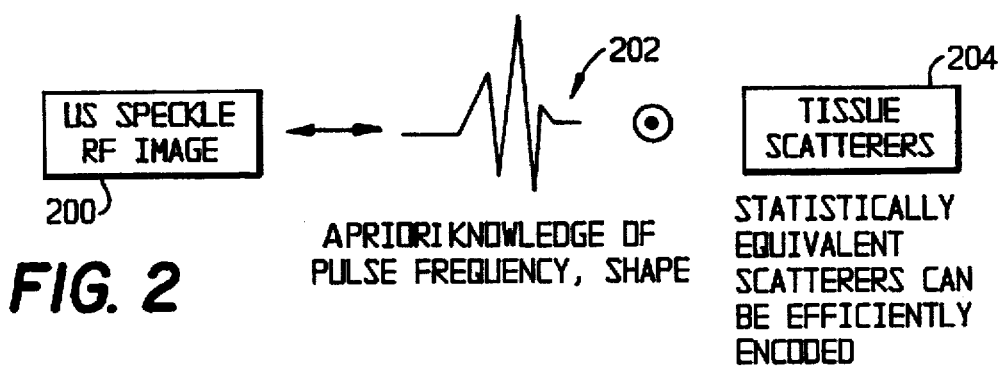
FIG. 2 is a schematic block diagram showing how a set of equivalent scatterers is defined, which, when convolved with an appropriate pulse, will reproduce the original ultrasound medical image with very small error.

FIG. 2 shows the theoretical equivalence of a speckle image as the convolution of a pulse with scatterers. It is important to note that, in any scanner, the pulse frequency and shape are known within reasonable accuracy. Each transducer therefore has certain imaging frequency (or frequencies in some cases) that are known a-priori and that are selected by the user and noted on the display. Such a-priori information can be used in the disclosed model-based compression techniques.

Referring again to FIG. 2, there is shown the ultrasound speckle RF image 200, a-priori knowledge of the pulse frequency shape 202 discussed above and the unknown set of scatterers 204 which, when convolved with the pulse 202, will reproduce the original speckle image 200. There are many known algorithms that could be employed to determine a set of scatterers 204 that could be used to reconstruct the speckle image 200. Such algorithms include a variety of deconvolution algorithms, Monti-Carlo algorithms, simulated annealing algorithms, genetic algorithms, and others. However, none of those algorithms is as efficient and well-conditioned as is desired and none of them produces a minimal set of scatterers that are the most efficient to compress.

In the preferred embodiment of the present invention, the known inputs, such as the original speckle image and a pulse shape (frequency and beamwidth), can be utilized. Using those known inputs, it is desired to derive a set of scatterers which, when convolved with the pulse, will accurately reproduce the speckle image. It should be stated that, in the discussions which follow, it is assumed that the original speckle image consists of envelope information in a 2-D Cartesian image format. However, the system of the present invention could be similarly adapted to intensity data or RF data and in other formats such as sector-scan or line-by-line ("A-line") formats.

Figure 3A:
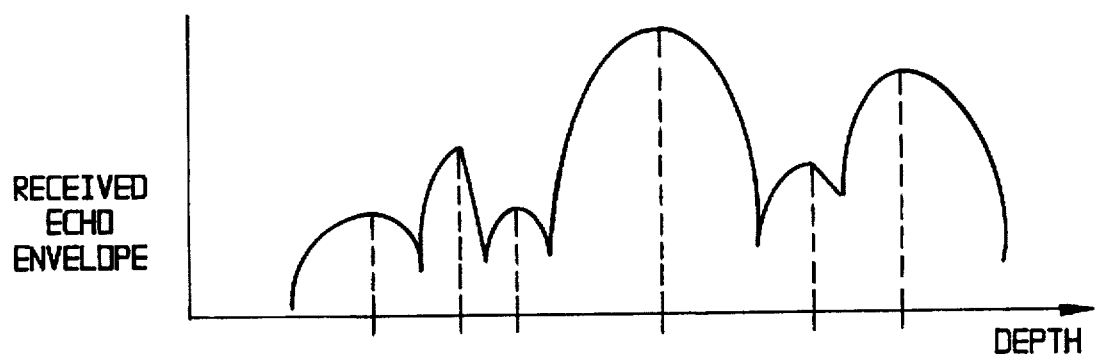
FIG. 3(A) is a graph showing the received echo envelope verses depth of a scatterer image.
Figure 3B:
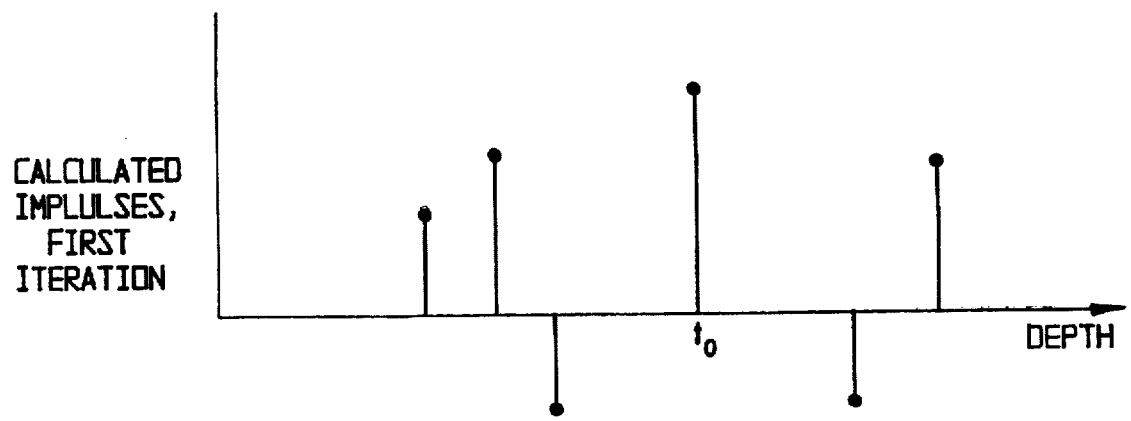
FIG. 3(B) is a graph showing the first iteration of the calculated pulses verses depth of the scatterer image shown in FIG. 3(A)
Figure 3C:
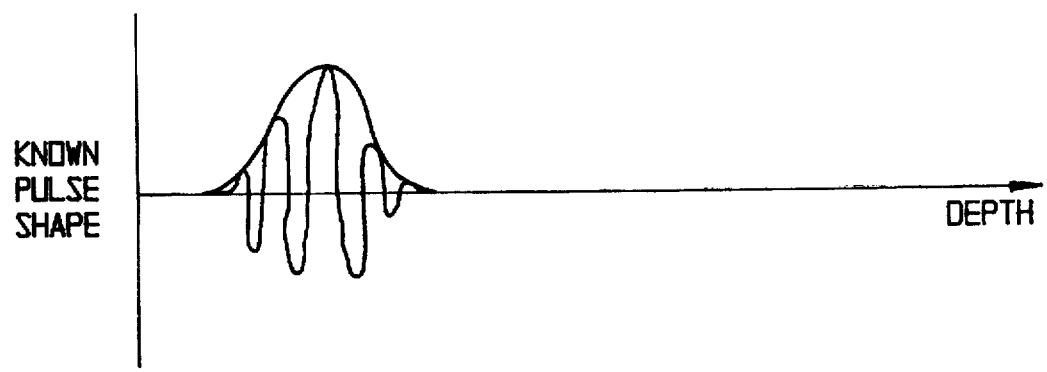
FIG. 3(C) is a graph of the known pulse shape verses depth which forms the a-priori knowledge shown in FIG. 2.

Different approaches to model-based compression of speckle images are possible. The preferred approach defines a minimal set of "equivalent scatterers." Using that approach, a sparse set of impulses is determined which, when convolved with an appropriate pulse, reproduces with a very small error the original ultrasound image. FIGS. 3A–3C illustrate that method in graphic form, in one dimension for simplicity. A great compression advantage is derived from the fact that sending information to a receiver concerning the pulse characteristics and a sparse set of impulses is much more efficient than sending pixel amplitude information. That is particularly true in the case of speckle images where high spatial frequencies obliterate the usual pixel-to-pixel redundancy that is sought in conventional compression techniques. The information sent to the receiver concerning the pulse characteristics and a sparse set of impulses is used by the receiver to convolve and reproduce the desired image.

The preferred algorithm begins with a "scatterer" image that is the same size and resolution as the original speckle image, such as that shown in FIG. 3A. All scatterer values are set to 0 initially, and then an iteration procedure begins. Starting at any convenient location in the speckle image, a local maximum of a single speckle "spot" is searched for. The definition of "local" is based on the speckle spot size, determined by the a-priori known pulse frequency, bandwidth and beamwidth parameters.

A single impulse, located at the local maximum of the speckle spot under consideration, is placed on the scatterer image. The strength or amplitude of the single impulse is adjusted such that, after convolution with the a-priori known pulse, the resulting speckle peak amplitude will be equal to the corresponding speckle peak amplitude in the original speckle image. Then, all other local speckle peaks are found and each of those processed to produce an impulse placed in the scatterer image. FIG. 3B shows a 1-dimensional depiction of the first iteration of such calculated impulses.

At the conclusion of this first iteration, as shown in FIG. 3B, the known pulse can be convolved with the newly determined impulses in order to produce a synthesized envelope image. FIG. 3C shows a graph of the known pulse shape that can be convolved with the newly determined impulses, as shown, for example, in FIG. 3B.

Let r(t) be the received echo amplitude of FIG. 3A, s(t) represent the scatterers or impulses of FIG. 3B, and p(t) represent the known pulse shape of FIG. 3C. Then $$r(t) = ENV\{s(t) * p(t)\} \qquad (1)$$

where ENV represents the envelope operation and * represents convolution. In the disclosed approach to model based compression, initially r(t) and p(t) are known, but s(t) is unknown and to-be-determined. Next, initially set s(t) to zero. Then, find the time (location) $t_0$ such that $r(t_0) = MAX\{r(t)\}$, where MAX represents the maximum value, global or alternatively local. Then choose $s(t) = \alpha\delta(t-t_0)$ where $\alpha$ is a coefficient and $\delta(t-t)$ represents a unit impulse at $t_0$ such that $$r(t_0) = ENV\{\alpha\delta(t-t_0) * p(t)\} \qquad (2)$$

that is:

$$r(t_0) = ENV\{\alpha p(t-t_0)\} \qquad (3)$$

that is:

$$\alpha = r(t_0)/ENV\{p(t-t_0)\} \qquad (4)$$

Thus, the first impulse of strength $\alpha$ and location $t_0$ is placed in s(t) of FIG. 3B, representing the scatterer image in the two dimensional image case. Further iterations on other speckle maxima serve to add other impulses, positive and negative, so as to determine a minimal set of impulses, s(t), that can be convolved with the pulse p(t) to reproduce the received echo r(t).

However, the image that is produced using the convolution process will not exactly equal the original speckle image. Thus, it may be desirable to perform a second iteration to obtain a greater degree of accuracy. During that second iteration, the impulse amplitudes can be further modified and additional impulses at new locations can be added in order to modify the result and reduce the error between the original speckle image and that produced using the convolution process.

One method of adding new impulses is to calculate the error between the original image and the synthesized image. At regions of maximum error, an impulse of the appropriate magnitude and sign is introduced such that, after convolution with the impulse and other impulses, the maximum error is eliminated. That process can be continued until the overall image error is decreased to the desired accuracy, or until no further decreases in error are observed.

Also, any residual errors at any step in the above-described iteration process can be encoded and transmitted to the receiver in a progressive fashion. The residual errors can be encoded separately using any conventional techniques such as DPCM, or other run-length encoding. In the scatterer image, the impulse locations and amplitudes, as determined by the iterative procedure described above, can be encoded by any convenient and efficient technique, such as entropy encoding or run-length encoding or vector quantization. In addition, information regarding the pulse shape in 2-dimensions is required.

The transmission/storage of information is accomplished using conventional and well known means.

Figure 4:
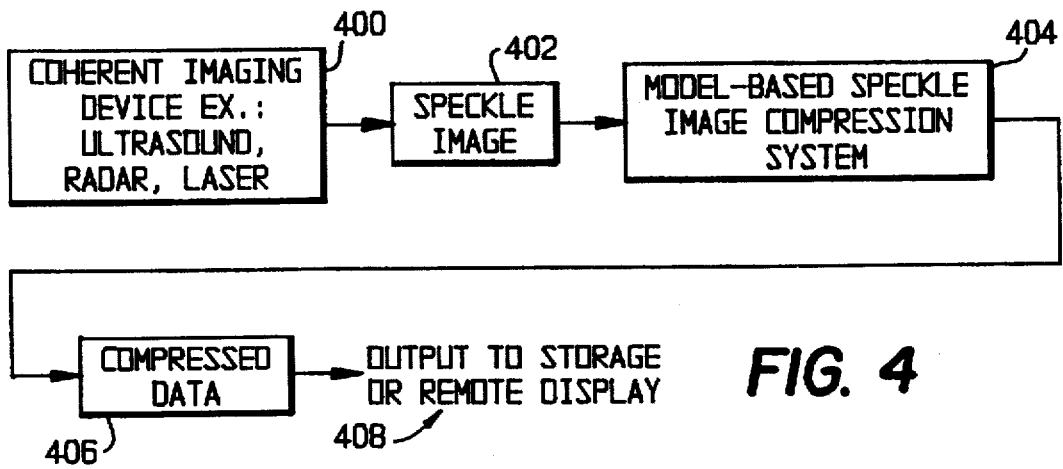
FIG. 4 is a schematic block diagram showing the basic elements used in connection with the system of model-based encoding of speckle images of the present invention.

Referring now to FIG. 4, there is shown in block diagram form the basic outlines of the invention. A coherent imaging device 400, such as an ultrasound, radar or laser device, produces a speckle image 402 which is compressed using a model-based speckle image compression system 404, which forms a primary subject of the instant invention. The compression system 404 produces the compressed data 406 which is then output to storage or to a remote display 408.

Figure 5:
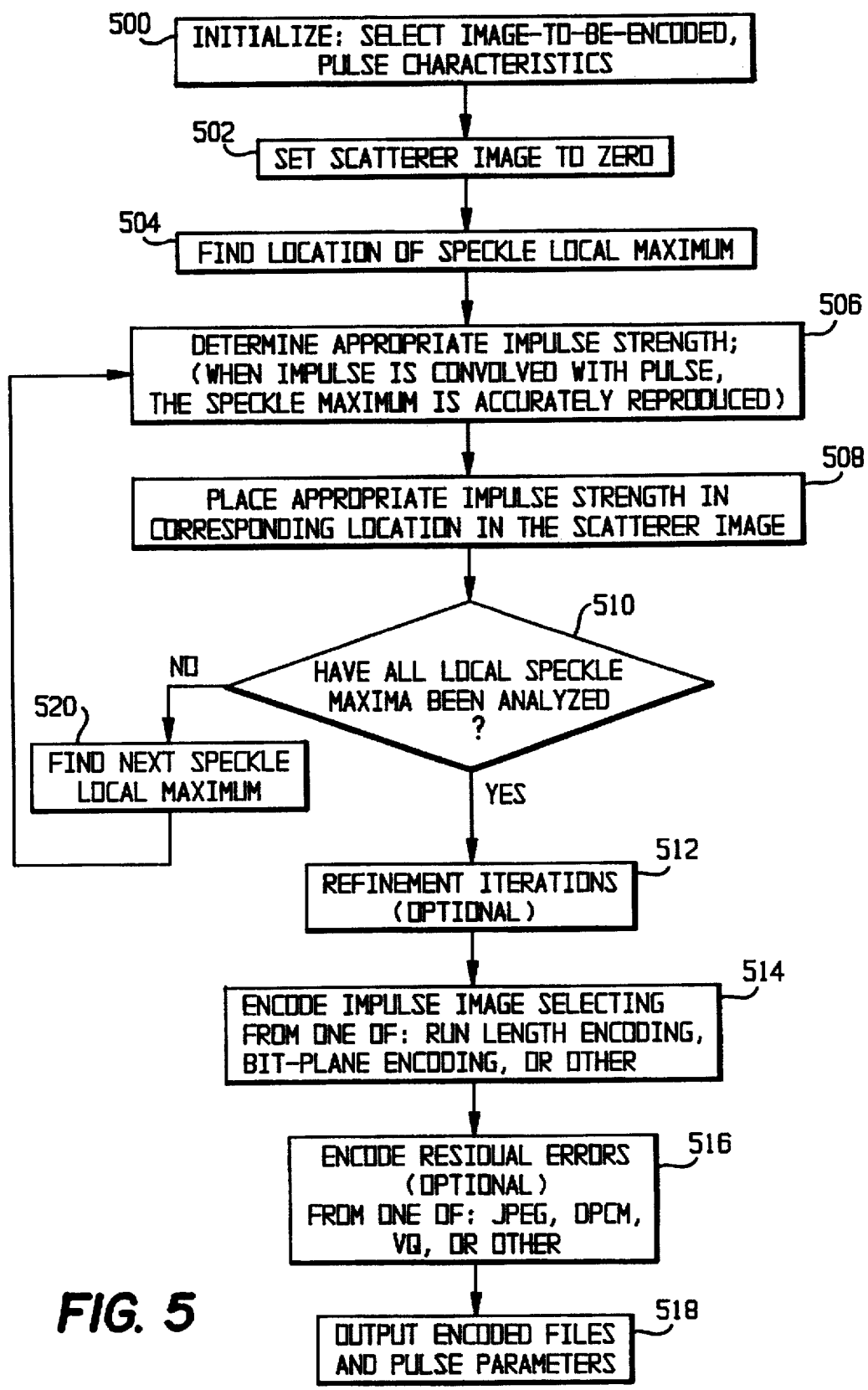
FIG. 5 is a diagram of a flow chart showing the steps performed by the compressor used to compress the speckle image in the model-based encoding system of the present invention.

FIG. 5 is a diagram of a flow chart for accomplishing the speckle image compression discussed above. At the beginning of the process, an initialization step 500 is performed. During that step, the image to be encoded is selected, as are the pulse characteristics. Then, at step 502, the scatterer image is set to zero. Next, at step 504, the location of the speckle local maximum is found.

After finding the speckle local maximum location at step 504, a determination of the appropriate impulse strength is performed at step 506. It will be remembered that when the impulse is convolved with the pulse, a speckle maximum is accurately reproduced. Next, at step 508, the appropriate impulse strength is placed in a corresponding location in the scatter image. Then, a determination is made at step 510 of whether all local speckle maxima have been analyzed. If the determination at step 510 is negative, then the next speckle local maxima is found at step 520 and the program then goes to step 506 and repeats steps 506, 508 and 510.

If an affirmative determination is made at step 510, then an optional refinement iteration step 512 may be performed, which, as discussed above, consists of a second or additional iterations in order to obtain a greater desired accuracy.

Then, at step 514, the impulse image is encoded by using one of run-length encoding, bit-plane encoding, or some other appropriate encoding scheme. Next, an additional optional step 516 may be performed. That step consists of the encoding of residual errors using techniques such as JPEG, DPCM, VQ, or other known techniques. Finally, at step 518, the encoded files and pulse parameters are output by the model-based speckle image compressed system 404 of the present invention. A PC with preferably 8 Mb of memory and a video frame grabber board could be used to implement the invention. The video capture board is used to digitize the video from an ultrasound scanner with a linear array transducer. The envelope image would be input to memory for processing and model-based compression. Pulse frequency and other parameters would be pre-selected by the operator of the PC system. The compressed files in a predetermined format may be output to a storage device and/or a network or a transmission medium. Another PC, also with preferably 8 Mb of memory, can be used as the receiver, decoder, and synthesizer.

Figure 6:
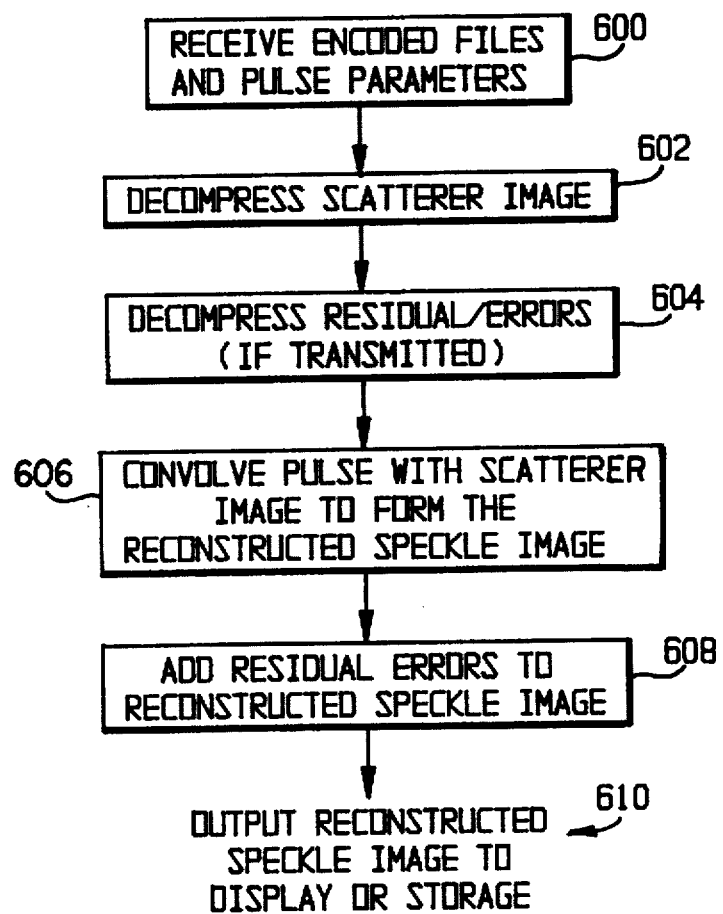
FIG. 6 is a diagram of a flow chart of the steps performed by the receiver/decoder of the compressed speckle image of the present invention in order to generate the reconstructed speckle image.

Referring now to FIG. 6 there is shown a diagram of a flow chart of the reconstruction steps performed once the encoded files and pulse parameters are received at a location remote from where they are output. It should be understood that the remote location can be connected by using any desired transmission medium, such as light beam, radio frequency, hard wire, etc.

Referring now to FIG. 6, at the remote location, the encoded files and pulse parameters are received at step 600.

The scatterer image is then decompressed at step 602. At step 604, if the residual errors have been transmitted, they are decompressed. Steps 602 and 604 form the decoding process, which accomplishes the decoding of the transmitted information concerning the impulses, the pulse and any optional residual error information.

Steps 606 and 608 form the reconstruction process, which utilizes the information decoded in steps 602 and 604. In the reconstruction process, the appropriate pulse is convolved with the decoded impulses to produce a synthetic image. Thus, at step 606, the pulse is convolved with the scatterer image to form the reconstituted or synthetic speckle image. Then, at step 608, the residual error information, if any, is added to the reconstructed speckle image to produce a lossless synthetic image. That image is output as the reconstructed speckle image to a display or storage, at step 610. In addition, the output reconstructed speckle image can be analyzed, measured, or used in some other way.

Using an accurate image model in the invention described herein, a high quality speckle image can be obtained with a compression ratio of 100:1 or greater. That compression ratio greatly exceeds the compression available using JPEG, DPCM, wavelets, sub-band encoding, or other conventional techniques.

It should be noted that there are some complicating factors which can be important in the model-based compression of speckle images described herein. For example, spatial varying imaging behavior is a major concern. Examples include frequency and depth dependent attenuation in ultrasound, as well as diffraction and defocusing effects in ultrasound, sonar and radar imaging systems.

The model-based compression system described herein can address those behaviors in at least two ways. A first approach is to use a spatially dependent pulse model, which requires additional complexity. A second approach is to utilize the single pulse convolution technique using a reasonable average pulse and to accept the consequences of having larger errors or residuals in the synthesized image. That implies either a lower quality, or a lower compression ratio, or both, depending upon the severity of the spatial variations in pulse characteristics.

Another concern is the use of model-based compression in image sequences. Such image sequences include sequential 2-D representations of a 3-D organ, or sequential images at the same scan plane of a moving target, such as the heart, or some combination of spatial and temporal movement. In all such cases, the model-based compression techniques described herein extend naturally to image sequences. The set of impulses derived from a previous speckle image plane can be utilized as the starting iteration of impulses for the next speckle image in the sequence. If the previous and next speckle images are greatly decorrelated, then the error in the resulting synthesized image will exceed a predetermined threshold. In that case, a zero impulse image can be used as a new starting point for the first iteration of a new set of impulses. Otherwise, in cases of good frame-to-frame correlation, the previous set of impulses will provide a good starting estimate for the next set of impulses and the iterative algorithm can successfully refine that estimate, as previously described.

In the above discussion, it should be obvious to those of ordinary skill in the art that variations in the image formation model and encoding can be successfully applied. For example, a speckle image could be decomposed into subbands, and a-priori knowledge of the speckle patterns as they appear in higher spatial frequency sub-bands can be applied to recognize those patterns and represent them with a simpler pattern, such as a sparse set of impulses.

It should also be noted that the present invention can be used with both lossy and lossless compression. As is well known, it is always possible to first transmit lossy, compressed image formation data, and then to transmit the "residuals" for errors in a progressive manner as circumstances permit. It should further be noted that the model-based compression techniques disclosed herein extend naturally to both color planes and to image sequences. Finally, it is assumed with the model-based compression techniques disclosed herein that either the RF data or the envelope image data (after processing and spatial interpolation by a digital scan converter) are available for use in the compression and decompression process. The envelope video information is always available on every manufactured scanner. The RF data is available in some cases only by a special arrangement with the manufacturers of the RF equipment.

Although only a preferred embodiment is specifically illustrated and described herein, it will be appreciated that many other modifications and variations of the present invention are possible in light of the above teachings and within the purview of the appended claims without departing from the spirit and intended scope of the invention.

What is claimed is:

1. A method for the compression of a speckle image using an image formation model employing image formation pulse characteristics and a scattering image model, comprising the steps of:
   a) finding the location in said speckle image to be compressed of a speckle local maxima;
   b) determining an appropriate strength of an impulse such that when said impulse is convolved with the image formation pulse, speckle local maxima is reproduced;
   c) placing said impulse of appropriate strength in a location in said scatterer image corresponding to the location of said speckle local maxima;
   d) repeating steps a)–c) for each additional speckle local maxima;
   e) encoding impulse image information relating to strength and location in said scatterer image as determined in steps b) and c); and
   f) outputting encoded impulse image information and pulse characteristics.

2. The method of claim 1, wherein said step of encoding impulse information is performed using one of run-length encoding and bit-plane encoding.

3. The method of claim 1, further including the initialization step of setting the scatterer image to zero.

4. The method of claim 1, further including the initialization step of performing refinement iterations prior to said encoding step.

5. The method of claim 4, wherein said step of performing refinement iterations comprises at least one of further modifying said impulse amplitudes and adding additional impulses at new locations of said scatterer image.

6. The method of claim 1, further including the step of determining any residual errors present in steps a)–d).

7. The method of claim 6, further including the steps of encoding said residual errors using one of JPEG, DPCM, VQ, sub-band, and run-length encoding and outputting said encoded residual errors in step f).

8. The method of claim 1, wherein said coherent imaging system is one of a radar, laser and ultrasound imaging system.

9. A method for the compression, transmission and decompression of a speckle imaging using the pulse characteristics of the coherent imaging system which produced the speckle image to be compressed as well as a scatterer image model, comprising the steps of:
   a) finding the location in said speckle image to be compressed of a speckle local maxima;
   b) determining an appropriate strength of an impulse such that when said impulse is convolved with at least one characteristic of said pulse said speckle local maxima is reproduced;
   c) placing said impulse of appropriate strength in a location in said scatterer image corresponding to the location of said speckle local maxima;
   d) repeating steps a)–c) for each additional speckle local maxima;
   e) encoding impulse image information relating to strength and location in said scatterer image as determined in steps b) and c); and
   f) transmitting said encoded impulse information and pulse characteristics;
   g) decoding said transmitted scatterer image; and
   h) convolving said transmitted pulse characteristics with said decoded scatterer image to form a reconstructed speckle image corresponding to said speckle image to be compressed.

10. The method of claim 9, further including the step of outputting said reconstructed speckle image for at least one of display and storage.

11. The method of claim 9, wherein said step of encoding impulse information is performed using one of run-length encoding and bit-plane encoding.

12. The method of claim 9, further including the initialization step of setting the scatterer image to zero.

13. The method of claim 9, further including the step of performing refinement iterations prior to said encoding step.

14. The method of claim 13, wherein said step of performing refinement iterations comprises at least one of further modifying said impulse amplitudes and adding additional impulses at new locations of said scatterer image.

15. The method of claim 9, further including the step of determining any residuals errors present in steps a)–d).

16. The method of claim 15, further including the steps of encoding said residual errors using one of JPEG, DPCM, VQ and run-length encoding and outputting said encoded residual errors in step f).

17. The method of claim 9, wherein said coherent imaging system is one of a radar, laser and ultrasound imaging system.

18. The method of claim 16, further including the steps of decoding said transmitted residual errors and adding said residual errors to said reconstructed speckle image.

19. A method for the compression of a speckle image using the pulse characteristics of the coherent imaging system which produced the speckle image which is to be compressed and a scatterer image model, comprising the steps of:
   a) modifying said scatterer image model to contain impulse information such that when said impulse information is convolved with at least one of said pulse characteristics, said speckle image which is to be compressed is reproduced; and
   b) compressing the modified scatterer image and outputting said compressed modified scatterer image and said pulse characteristics.

20. The method of claim 19, further comprising the step of further modifying the modified scatterer image to more accurately reproduce said speckle image to be compressed.

21. The method of claim 19, further comprising the steps of compressing any residual errors present in said compression method, and outputting said compressed residual errors with the compressed modified scatter image and said pulse characteristics.

22. A method for compressing and decompressing speckle image sequences using an image formation model, comprising the steps of:

generating a model of image formation;

matching the speckle image sequences to a corresponding sequence of pulse and scatterer information in order to generate a sequence of pulse and scatterer information;

compressing said sequence of pulse and scatterer information;

decompressing said sequence of pulse and scatterer information; and reconstructing said speckle image sequences using said model of image formation and said sequence of pulse and scatterer information.

23. A system for transmitting and receiving speckle image sequences using an image formation model, comprising a transmitter and a receiver, each employing said image formation model and in which said transmitter compares said speckle image sequences to be transmitted to said image formation model and derives certain predetermined parameter information from said speckle image sequences, compresses and transmits said predetermined parameter information to said receiver which receiver decodes said compressed predetermined parameter information and reconstructs said speckle image sequences using said image formation model and said predetermined parameter information.

* * * * *